United States Patent [19]

Job

[11] Patent Number: 4,804,648
[45] Date of Patent: * Feb. 14, 1989

[54] CRYSTALLINE OLEFIN POLYMERIZATION CATALYST COMPONENT

[75] Inventor: Robert C. Job, Houston, Tex.

[73] Assignee: Shell Oil Company, Houston, Tex.

[*] Notice: The portion of the term of this patent subsequent to Dec. 1, 2004 has been disclaimed.

[21] Appl. No.: 124,715

[22] Filed: Nov. 24, 1987

Related U.S. Application Data

[63] Continuation-in-part of Ser. No. 875,843, Jun. 18, 1986, Pat. No. 4,710,482.

[51] Int. Cl.$^4$ ............................................. C08F 4/64
[52] U.S. Cl. ................................. 502/119; 502/118; 502/121; 502/123; 502/124; 502/125; 502/126; 502/127; 502/128; 502/133; 502/134; 526/124
[58] Field of Search ............... 502/118, 121, 123, 124, 502/125, 126, 127, 128, 133, 134, 119

[56] References Cited

U.S. PATENT DOCUMENTS

| | | | |
|---|---|---|---|
| 4,328,328 | 5/1982 | Minami et al. | 502/125 X |
| 4,329,253 | 5/1982 | Goodall et al. | 502/125 X |
| 4,393,182 | 7/1983 | Goodall et al. | 526/125 |
| 4,400,302 | 8/1983 | Goodall et al. | 502/125 X |
| 4,414,132 | 11/1983 | Goodall et al. | 502/125 X |
| 4,465,783 | 8/1984 | McKenzie | 502/134 X |
| 4,478,952 | 10/1984 | Mack et al. | 502/110 |
| 4,540,679 | 9/1985 | Arzoumanidis et al. | 502/127 X |
| 4,710,482 | 12/1987 | Job | 502/127 |

FOREIGN PATENT DOCUMENTS 2101610 1/1983 United Kingdom .

OTHER PUBLICATIONS

"Alkoxymagnesium Halides", by N. Ya. Turova & E. P. Turevskaya, J. of Organometal. Chemistry, 42, (1972) pp. 8-17.

*Primary Examiner*—Patrick P. Garvin
*Attorney, Agent, or Firm*—Donald F. Haas

[57] ABSTRACT

Crystalline magnesium olefin polymerization catalyst components capable of producing polymer with improved activity and morphological properties are disclosed and claimed. In particular, the components are prepared by reacting a crystalline alkoxy magnesium compound with a halide of tetravalent titanium.

33 Claims, 2 Drawing Sheets

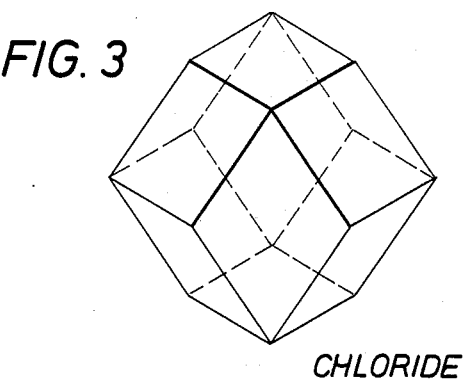
FIG. 3 CHLORIDE
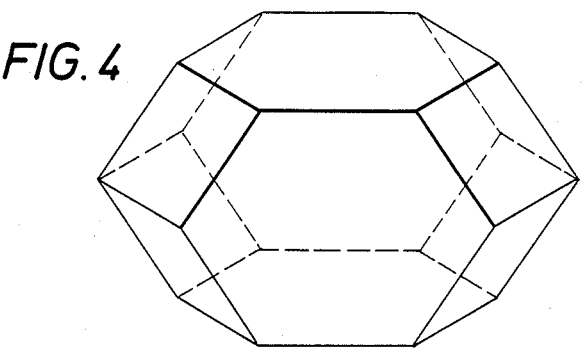
FIG. 4 BROMIDE
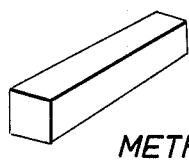
FIG. 5 METHACRYLATE
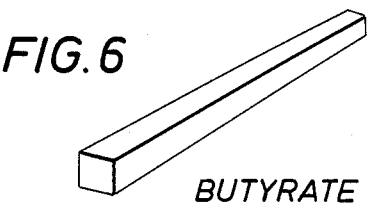
FIG. 6 BUTYRATE
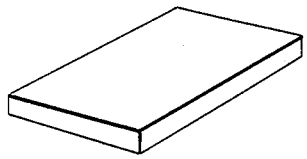
FIG. 7 RESORCINOLATE
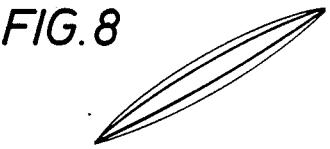
FIG. 8 ACRYLATE ACETATE
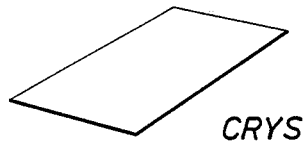
FIG. 9 CRYSTALINE FLAKES
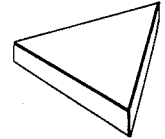
FIG. 10 PROPIONATE
FIG. 11 BENZOATE
FIG. 12 CHLOROACETATE

CRYSTALLINE OLEFIN POLYMERIZATION CATALYST COMPONENT

This application is a continuation-in-part of my application entitled "Olefin Polymerization Catalyst Component", Ser. No. 875,845, filed June 18, 1986, and now U.S. Pat. No. 4,710,482.

FIELD OF THE INVENTION

This invention relates to a process for preparing crystalline olefin polymerization catalyst components having improved activity and morphological properties. This crystalline polymerization catalyst component is prepared from a crystalline magnesium compound described more fully below.

BACKGROUND OF THE INVENTION

Numerous proposals are known from the prior art to provide olefin polymerization catalysts by combining a solid component comprising at least magnesium, titanium and chlorine with an activating organoaluminum compound. These may be referred to as supported coordination catalysts or catalyst systems. The activity and stereospecific performance of such compositions is generally improved by incorporating an electron donor (Lewis base) in the solid component and by employing as a third catalyst component an electron donor which may be complexed in whole or in part with the activating organoaluminum compound.

For convenienve of reference, the solid titanium-containing constituent of such catalysts is referred to herein as "procatalyst", the organoaluminum compound, whether used separately or partially or totally complexed with an electron donor, as "cocatalyst", and the electron donor compound, whether used separately or partially or totally complexed with the organoaluminum compound, as "selectivity control agent" (SCA).

Supported coordination catalysts of this type are disclosed in numerous patents. The catalyst systems of this type which have been disclosed in the prior art generally are able to produce olefin polymers in high yield and, in the case of catalysts for polymerization of propylene or higher alpha-olefins, with high selectivity to stereoregular polymer. However, further improvements in productivity at high stereoregularity are still being sought.

The objective of workers in this art is to provide catalyst systems which exhibit sufficiently high activity to permit the production of polyolefins in such high yield as to obviate the necessity of extracting residual catalyst components in a deashing step. In the case of propylene and higher olefins, an equally important objective is to provide catalyst systems of sufficiently high selectivity toward isotactic or otherwise stereoregular products to obviate the necessity of extracting atactic polymer components.

Although many chemical combinations provide active catalyst systems, practical considerations have led the workers in the art to concentrate on certain preferred components. The procatalysts typically comprise magnesium chloride, titanium chloride, generally in tetravalent form, and as electron donor an aromatic ester such as ethyl benzoate or ethyl-p-toluate. The cocatalyst typically is an aluminum trialkyl such as aluminum triethyl or aluminum tri-isobutyl, often used at least partially complexed with a selectivity control agent. The selectivity control agent typically is an aromatic ester such as ethyl-paramethoxybenzoate (ethyl anisate) or methyl-p-toluate. While the selection of cocatalyst and selectivity control agent affects the performance of those catalyst systems, the component which appears to be subject to most significant improvement with respect to activity and productivity of the system is the procatalyst.

Preferred methods of preparing such procatalysts are claimed in U.S. Pat. Nos. 4,329,253; 4,393,182; 4,400,302; 4,328,328; 4,478,952 and 4,414,132. These procatalysts are highly active and stereospecific. The typical manner of preparing such procatalysts involves the reaction of the magnesium compound, titanium tetrachloride and electron donor in the presence of a halohydrocarbon. The resulting solid particles are then contacted with additional quantities of $TiCl_4$ and are completed by washing off excess $TiCl_4$ usingl ight hydrocarbons (e.g., isooctane and isopentane) and drying.

The procatalysts described above have excellent polymerization activity (polymer yield) and stereospecific performance (isotactic content). However, for some applications the polymer morphology is not ideal. In olefin polymerization, polymer morphology is known to be a replica of catalyst morphology. Still further, the procatalyst morphology also depends upon the morphology of the starting magnesium compound. Accordingly, if one desires to have optimal catalyst morphology (e.g. spheroidal particles), then it is desirable to employ starting magnesium compounds of the same morphology.

A number of different approaches to improve morphology are suggested in the patent literature. One approach, disclosed in GB No. 2,101,610, involves reacting a solid particulate material with an organic magnesium compound, treating the supported magnesium composition with oxygen, carbon dioxide or a hydroxyl compound, reacting the treated product with a carbonyl compound and simultaneously or subsequently reacting with a transition metal compound. Another approach, disclosed in U.S. Pat. No. 4,465,783, involves the spray drying of a transition metal composition, or a support for a transition metal compound, suspended in a liquid medium. Still another method is disclosed in DE No. 2,839,188, where solid magnesium dialkoxide particles are dispersed into a suitable liquid phase, followed by spray-drying. However, the process of the '188 patent is not attractive as the dispersed solid particles will tend to clog the fine orifices of the spray-drying equipment and will foul the pumping and metering systems. In U.S. Pat. No. 4,540,679, use is made of a magnesium hydrocarbyl carbonate support. In the '679 patent, a suspension of magnesium alcoholate with carbon dioxide is reacted with a transition metal component to precipitate a "magnesium hydrocarbyl carbonate" support. The patentees use a number of techniques, including prepolymerization and the use of triethyl aluminum (TEA) to remove ethanol, to improve productivity. However, these techniques are not desirable because, for example, prepolymerization is an additional step and the addition of TEA adds ash to the polymer product.

The above-mentioned approaches to morphology control all depend upon starting from roughly spherical amorphous, non-stoichiometric shapes. A new method to improve morphology is greatly desired.

A new approach has now been found, unique in that the magnesium precursor is a molecule with a definite stoichiometry which forms crystalline particles of well defined shape, and that permits the preparation of crystalline procatalyst molecules which form procatalyst particles having not only excellent productivity and selectivity, but also possessing excellent morphology. The polymer particles will have the shape of the procatalyst particles which have the shape of the magnesium precursor particles. Also, surprisingly, the shape of the polymer particle can be changed by changing X, the counter ion. The organomagnesium compounds commonly used to produce magnesium/titanium procatalysts, such as diethoxy magnesium, are non-crystalline and produce a procatalyst which is also non-crystalline. Furthermore, the polymer particles produced with such catalysts are of widely varying shape and, for the most part, are useless for controlled morphology applications. The crystalline catalyst components of the present invention are thus very different from the commonly used procatalysts and produce olefin polymers with much different morphological properties.

SUMMARY OF THE INVENTION

The present invention relates to an improved solid catalyst component for the polymerization of olefins. In particular, the present invention relates to a magnesium halide/titanium halide catalyst component comprised of molecules which form crystalline solids and are useful for the polymerization of olefins which has been obtained by contacting a crystalline alkoxy magnesium compound with a halide of tetravalent titanium, optionally in the presence of an electron donor, and then contacting the resulting halogenated product with a tetravalent titanium halide. The resulting product may then be washed to remove unreacted titanium compounds and the solid product recovered.

In a preferred embodiment, the magnesium compound is comprised of crystalline molecules having the formula $[Mg_4(OR)_6(R'OH)_{10}]X$ where X is a counter ion or ions having a total charge of $-2$ and R and R', which may be the same or different, are selected from alkyl groups of 1 to 4 carbon atoms. Preferred elements for X are chlorine and bromine. Other preferred counter ions are shown in FIGS. 5 through 12. When either is present, the particles of this compound have a crystal habit which is an essentially regular rhombic dodedecahedron. An average of such a structure is that it is essentially tangential to a spherical surface and thus has a very close to optimum morphology which will carry through to the polymer.

As shown in the examples which follow, propylene polymers made with catalysts according to the present invention have high bulk densities up to and greater than 0.4 grams per cubic centimeter. Also, as shown in the examples, the catalysts of the present invention possess an unexpected balance of excellent catalytic properties, including:
high activity
high selectivity to isotactic structures
good resin shape (morphology)
low catalytic decay
high bulk density (See Illustrative Embodiment II)
greater productivity per reactor volume
narrow range of particle distribution, especially including low fines (See Illustrative Embodiment II)
Another advantage is that the alkoxy species in the catalyst appears to be resident on the Mg instead of the Ti as with prior art catalysts prepared from magnesium ethoxide, which may help to explain the high activity of this catalyst.

Another important aspect of the invention relates to the preparation of the halogenated product from the starting magnesium crystalline compound. This halogenation takes place in the presence of a tetravalent titanium halide (e.g. $TiCl_4$) and an optical electron donor (e.g. an ester of an aromatic carboxylic acid). As shown in the examples, it is also much preferred that the halogenation also takes place in the presence of a halohydrocarbon (e.g. chlorobenzene).

BRIEF DESCRIPTION OF THE DRAWINGS

There are a number of important aspects to the present invention. One, as mentioned above, relates to the dodecahedron structure.

Another important aspect relates to the method by which the stable magnesium crystal is prepared.

Figure 2:
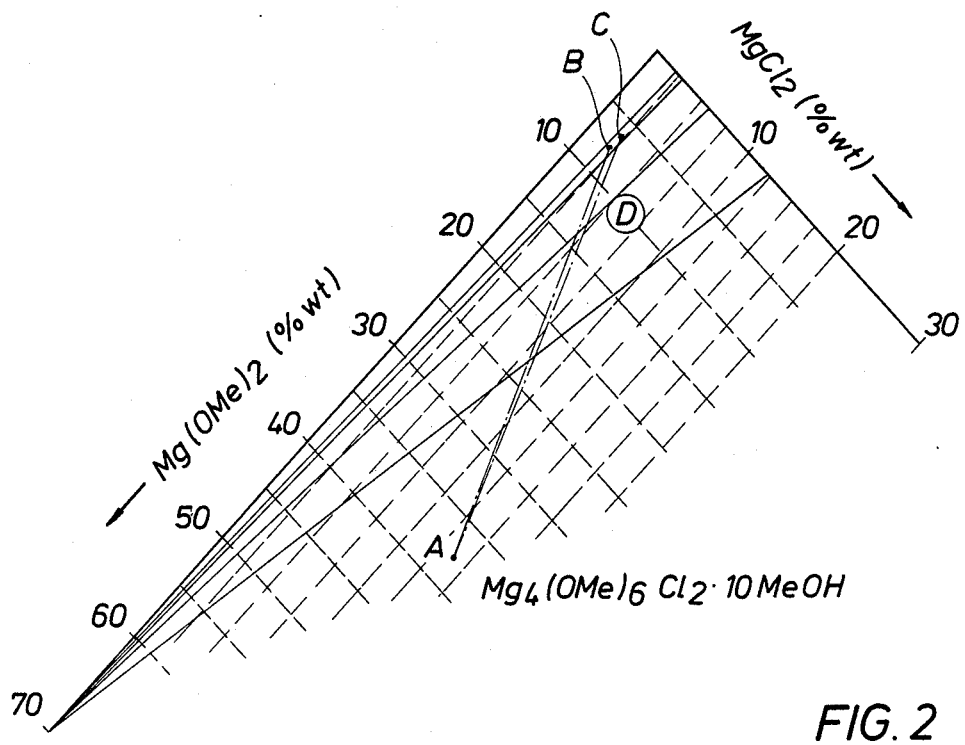

FIG. 2 shows a ternary phase diagram for the system magnesium methoxide, magnesium chloride, methanol. Until this invention the narrow triangle ABC was the only region of component concentrations which could be employed to achieve the stable crystal $Mg_4(OMe)_6Cl_2 \cdot 10MeOH$.

FIG. 3 shows the precursor, procatalyst and polymer particle shape when X=Cl.

FIG. 4 shows the precursor, procatalyst and polymer particle shape when X=Br.

FIG. 5 shows the precursor, procatalyst and polymer particle shape when X=methacrylate or a methacrylate/resorcinolate mixture.

FIG. 6 shows the precursor, procatalyst and polymer particle shape when X=butyrate.

Figure 1:
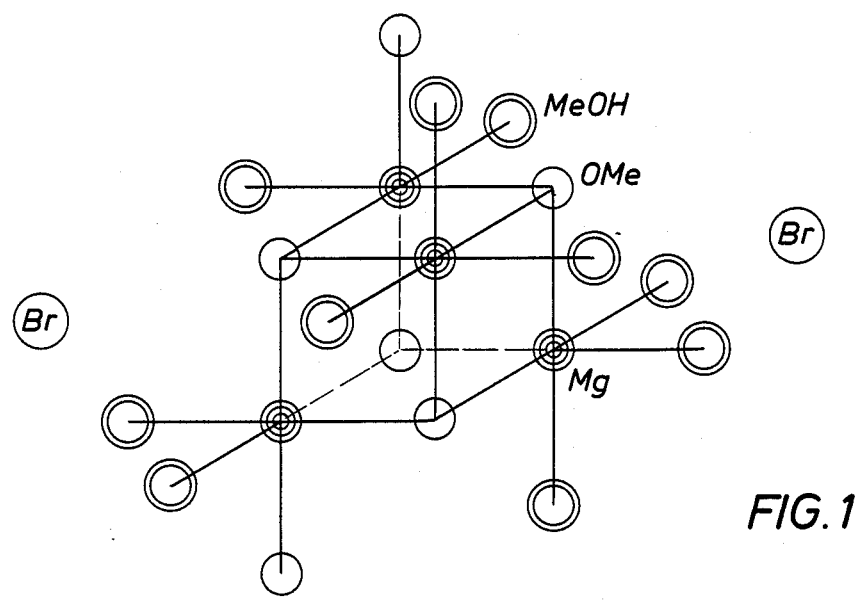
FIG. 1 shows the molecular structure of the dication as determined by single crystal X-ray diffraction, where the blackened circles are Mg, the small open circles are methoxy ($OCH_3$) and the large open circles are methanol ($CH_3OH$). Note that two bromide ions serve only to balance the positive charge but are not essential to the molecular structure.

FIG. 7 shows the precursor, procatalyst and polymer particle shape obtained with the Mg compound of FIG. 1 when X is resorcinolate or an acetate/resorcinolate mixture.

FIG. 8 shows the precursor, procatalyst and polymer shape produced with the Mg compound of FIG. 1 when X is acrylate or acetate.

FIG. 9 shows the precursor, procatalyst and polymer shape produced with the Mg compound of FIG. 1 when X is 2,4-pentanedionate.

FIG. 10 shows the precursor, procatalyst and polymer shape produced with the Mg compound of FIG. 1 when X is propionate.

FIG. 11 shows the precursor, procatalyst and polymer shape produced with the Mg compound of FIG. 1 when X is benzoate.

FIG. 12 shows the precursor, procatalyst and polymer shape produced with the Mg compound of FIG. 1 when X is chloroacetate.

DETAILED DESCRIPTION OF THE INVENTION

The key aspect of the present invention involves the use and preparation of an alkoxy magnesium compound formed of crystalline molecules. One example of such a magnesium compound has the formula $[Mg_4(OR)_6(R'OH)_{10}]X$, where X is a counter ion or ions having a total charge of $-2$ and R and R', which may be the same or different, are alkyl groups of 1 to 4 carbon atoms. In a preferred embodiment, X is selected from the group consisting of 2BR−, 2Cl−, methacrylate, butyrate, resorcinolate, acrylate, acetate, propionate, 2,4-pentanedionate, chloroacetate and benzoate. The most preferred counter ions for X are 2Br− and 2Cl− because they have the best particle shapes, i.e. the closest to spherical. R and R′ are preferably —CH$_2$CH$_3$ or —CH$_3$, with —CH$_3$ being the most preferred of the two There are a number of means to prepare such starting magnesium compounds. One way is disclosed in the article "Alkoxymagnesium Halides" by Turova et al, JOURNAL OF ORGANOMETALLIC CHEMISTRY, 42, pages 9–17 (1972), which disclosure is herein incorporated by reference. The phase diagram shown in the attached FIG. 2 is similar to the phase diagram shown in FIG. 1 of the Turova article. As mentioned above it is much preferred that the "R" and "R′" in the crystal structure be a methyl group. Accordingly, the remainder of the disclosure will reference methanol, methyl or methoxy groups.

One method to prepare molecules with the crystal structures of the present invention (as disclosed in Turova et al) involves preparing solutions of MgCl$_2$ in methanol and Mg(OCH$_3$)$_2$ in methanol, then mixing the controlled solutions in a mole ratio of MgCl$_2$ to Mg(OCH$_3$)$_2$ of 1:3 and then removing the methanol solvent until the crystals are formed. If desired, small amounts of vaseline oil may be added to improve crystallization.

Another equivalent method disclosed herein involves the use of Mg metal, MgCl$_2$ and methanol. In this method three equivalents of the Mg is dissolved in a methanolic solution of MgCl$_2$ to again provide the 3:1 mole ratio of methoxide to chloride.

The extremely narrow stability range required by the ternary phase relationship would tend to make either of the above methods difficult for commercial implementation. As discussed in the above-mentioned article by Turova, it requires great care to control solution concentrations and conditions to prepare stable crystal structures. Such care may be possible under laboratory conditions, but such level of care may be very difficult under commercial plant conditions. Accordingly, applicant has also discovered a method for preparing such structures by using a "buffer" technique. In this technique advantage is taken of the ability of the Si(OR)$_4$ to virtually buffer the methanolic solution over a wide range of effective methoxide concentrations to prevent the irreversible polymerization represented by k$_1$, in the following scheme where the pertinent tetramer/monomer equilibrium is represented by the equilibrium constant K and where in normally, non-buffered solutions k$_1$, and k$_2$ (reaction rates) become rapid either at temperatures above 30° C. or at concentrations above about 8% Mg(OCH$_3$)$_2$ (by weight in CH$_3$OH). In any reasonable commercial process concentrations of 12 to 25% and temperatures above 30° C. would be expected to be used and thus this stabilization technique becomes essential. It allows one to obtain up to a 28% concentration at the boiling point of CH$_3$OH (67° C.).

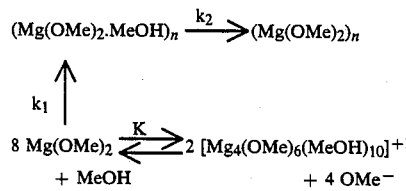

Eq. 1
Eq. 2

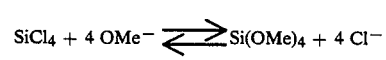

Eq. 3

In the above scheme, magnesium methoxide and methanol are in equilibrium in solution with the crystalline magnesium compound. If conditions are not right, then as shown in Equation 2, (Mg(OCH$_3$)$_2$MeOH) precipitate occurs. If concentrations are extremely high, this precipitate polymerizes to [Mg(OCH$_3$)$_2$]$_n$, polymer. However, if Si(OR)$_4$ is added to the system, then it is possible to operate effectively in a wide range of concentrations outside of the narrow wedge (ABC) described in Turova. This is shown in FIG. 2 where Si(OR)$_4$ has been generated in situ as illustrated in Equation 3, by circle D which represents the effective methoxy/chloro concentrations of examples 5 and 6 below. This buffering approach effectively opens the wedge by moving the line AC to the right.

Materials other than just SiCl$_4$ can be used to buffer the solution. Anything that can abstract methoxy and does not provide an anion so large as to seriously distort the crystal shape may be used. These compounds include silicon tetrachloride, silicon tetrabromide, tetramethoxy silane, tetraethoxy silane and phenyltrimethoxy silane as well as oxalic acid, acetic acid and formic acid, where if Si(OR)$_4$ is not generated in situ it must be added to the solution. Phosphorous compounds such as P(OCH$_3$)$_3$, PCl$_3$ and PBr$_3$ may also be used so that P(OR)$_3$ is present.

Another method for producing stable alkoxy magnesium compounds within the scope of the present invention involves treating the buffer compound, such a silicon tetrahalide, with an alkoxy magnesium compound, such as dimethoxy magnesium. This would then be followed by the addition of methanol, for example, thereby generating the stabilizing Si(OR)$_4$ species in situ. The alkoxy magnesium compound of the present invention can then be produced simply adding to this solution a solution of dimethoxy magnesium. The stabilized alkoxy magnesium compounds above may be subjected to a further stabilizing treatment. One method involves treating the above produced compounds with hydrogen chloride gas. Catalysts treated in this manner will produce a polymer with extremely high bulk density, very low polymer fines and good shape replication but with an extremely rough polymer surface. The alkoxy magnesium compounds above may also be boiled in an inert hydrocarbon, e.g. isooctane or cyclohexane. Any liquid hydrocarbon that forms azeotropes with methanol may be used. This stabilizing method produces a polymer with high bulk density, perfect shape replication and a smooth surface, but the productivity is lower than with the HCl treatment. If there is no treatment, then the polymer has a high bulk density but the shape retention is not as good. It is theorized that these methods remove excess methanol groups from the alkoxy magnesium compound and that a consequence of this removal is an increase in the stability of the crystal structure. Another advantage of this approach is to decrease the Ti level in the final procatalyst by decreasing the amount of sparingly soluble (Cl)(OMe)Ti species which may be formed upon contact with TiCl$_4$. The boiling procedure has a tendency to decrease the activity of the catalyst. This can be at least partially prevented by first adding an amount of Si(OR)$_4$ and then proceeding with the boiling operation.

In addition to Mg(OCH$_3$)$_2$, other starting components include halogen containing magnesium compounds and magnesium dialkoxides. Examples of halogen containing magnesium compounds that can be used as starting materials for the reaction are alkoxy magnesium halides, such as isobutoxy magnesium chloride, ethoxy magnesium chloride, and ethoxy magnesium bromide.

Preferred magnesium compounds are magnesium dialkoxides. In such compounds the alkoxide groups suitable have from 1 to 4 carbon atoms. Examples of these preferred groups of compounds are magnesium di-isopropoxide, magnesium diethoxide, magnesium dibutoxide, and ethoxy magnesium isobutoxide. Magnesium dimethoxide is particularly preferred.

The basic molecular structure of the magnesium compound made according to the procedure discussed immediately above when X=2Cl$^-$ or 2Br$^-$ is illustrated in FIG. 1. The structure of particles of this compound is basically a dodecahedron structure. Furthermore, the polymer produced with the magnesium material of FIG. 1 produces polymer particles with a dodecahedron type structure as shown in FIGS. 3 or 4.

Once the uniformly optimized particles of the magnesium compound have been obtained, it is then necessary to convert the compounds to magnesium halides in a metathesis reaction (digestion), such as that disclosed in U.S. Pat. No. 4,414,132. In the halogenation with a halide of tetravalent titanium, the magnesium compounds are preferably reacted to form a magnesium halide in which the atomic ratio of halogen to magnesium is at least 1.2. Better results are obtained when the halogenation proceeds more completely, i.e., yielding magnesium halides in which the atomic ratio of halogen to magnesium is at least 1.5. The most preferred reactions are those leading to fully halogenated reaction products, i.e., magnesium-dihalides. Such halogenation reactions are suitably effected by employing a molar ratio of magnesium compound to titanium compound of 0.005:1 to 2:1, preferably 0.01:1 to 1:1. These halogenation reactions may be conducted in the additional presence of a halohydrocarbon and/or an electron donor. An inert hydrocarbon diluent or solvent may also be present. When using an inert diluent or solvent, this may be used as a complete substitute for the halohydrocarbon.

Suitable halides of tetravalent titanium include aryloxy- or alkoxy-di- and trihalides, such as dihexanoxy-titanium dichloride, diethoxy-titanium dibromide, isopropoxy-titanium tri-iodide and phenoxytitanium trichloride. Titanium tetrahalides are preferred. The most preferred halide is titanium tetrachloride.

Suitable halohydrocarbons are compounds such as butyl chloride, amyl chloride and the following more preferred compounds. Preferred aliphatic halohydrocarbons are halogen-substituted hydrocarbons with 1 to 12, particularly less than 9, carbon atoms per molecule, comprising at least two halogen atoms, such as dibromomethane, trichloromethane, 1,2-dichloroethane, dichlorobutane, 1,1,3-trichloroethane, trichlorocyclohexane, dichlorofluoroethane, trichloropropane, trichlorofluorooctane, dibromodifluorodecane, hexachloroethane and tetrachloroisooctane. Carbon tetrachloride and 1,1,3-trichloroethane are preferred aliphatic halohydrocarbons. Aromatic halohydrocarbons may also be employed, e.g., chlorobenzene, bromobenzene, dichlorobenzene, dichlorodibromobezene, naphthyl chloride, chlorotoluene, dichlorotoluenes, and the like. Chlorobenzene and dichlorobenzene are preferred aromatic halohydrocarbons.

Suitable electron donors which may be used in the preparation of the solid catalyst component are ethers, esters, ketones, phenols, amines, amides, imines, nitriles, phosphines, phosphites, stibines, arsines, phosphoramides and alcoholates. Examples of suitable donors are those referred to in U.S. Pat. No. 4,136,243 or its equivalent British Specification No. 1,486,194 and in British Specification No. 1,554,340 or its equivalent German Offenlegungsschrift No. 2,729,126. Preferred donors are esters, diesters and diamines, particularly esters and diesters of aromatic carboxylic acids, such as ethyl and methyl benzoate, p-methoxy ethyl benzoate, p-ethoxy methyl benzoate, ethyl acrylate, methyl methacrylate, ethyl acetate, dimethyl carbonate, dimethyl adipate, isobutyl phthalate, dihexyl fumarate, dibutyl maleate, ethylisopropyl oxalate, p-chloro ethyl benzoate, p-amino hexyl benzoate, isopropyl naphthenate, n-amyl toluate, ethyl cyclohexanoate, propyl pivalate, N,N,N',N'-tetramethylethylene diamine, 1,2,4-trimethyl piperazine, 2,2,5,5-tetraethyl piperidine and similar compounds. The electron donors may be used singly or in combination. Preferred electron donors for use in preparing the titanium constituent are ethyl benzoate and isobutyl phthalate.

The halogenation normally proceeds under formation of a solid reaction product which may be isolated from the liquid reaction medium by filtration decantation or another suitable method and may be subsequently washed with an inert hydrocarbon diluent, such as n-hexane, iso-octane or toluene, to remove any unreacted material, including physically absorbed halohydrocarbon. Subsequent to halogenation, the product is contacted with a tetravalent titanium halide such as a dialkoxy-titanium diahalide, alkoxy-titanium trihalide, phenoxy-titanium trihalide or titanium tetrahalide. The most preferred titanium compounds are titanium tetrahalides and especially titanium tetrachloride. This treatment increases the content of tetravalent titanium in the solid catalyst component. This increase should preferably be sufficient to achieve a final atomic ratio of tetravalent titanium to magnesium in the solid catalyst component of from 0.005 to 3.0, particularly of from 0.02 to 1.0. To this purpose the contacting with the tetravalent titanium chloride is most suitably carried out at a temperature of from 60° to 136° C. during 0.1-6 hours, optionally in the presence of an inert hydrocarbon or halohydrocarbon diluent. Particularly preferred contacting temperatures are from 70° to 120° C. and the most preferred contacting periods are between 0.5 to 3.5 hours. The treatment may be carried out in successive contacts of the solid with separate portions of TiCl$_4$, which may contain suitable electron donors chosen from the previous list. The preferred halogen atom, possibly contained in the titanium compound which serves as halogenating agent and in the tetravlaent titanium halide with which the halogenated product is contacted, is chlorine.

After the treatment with tetravalent titanium halide the catalyst component is suitably isolated from the liquid reaction medium and washed to remove unreacted titanium compound. The titanium content of the final, washed catalyst constituent is suitably between about 1.5 to 3.6 percent by weight or up to about 4.5 percent. The material used to wash the catalyst component is an inert, light hydrocarbon liquid. Preferred light hydrocarbon liquids are aliphatic, alicyclic and aromatic hydrocarbons. Examples of such liquids include iso-pentane, n-hexane, iso-octane and toluene, with iso-pentane being most preferred. The amount of light hydrocarbon liquid employed is 5 to 100 cc/gm of procatalyst in each of 2 to 6 separate washes, preferably about 25 cc/gm. The resulting solid component is the procatalyst, which is used with cocatalyst and selectivity control agent in the polymerization process.

Suitable electron donors, which may optionally (and preferably) be used in combination with or reacted with an organoaluminum compound as selectivity control agents and which are also used in the preparation of the solid catalyst component are ethers, esters, ketones, phenols, amines, amides, imines, nitriles, phosphines, silanes, phosphites, stilbines, arsines, phosphoramides and alcoholates. Examples of suitable donors are those referred to in U.S. Pat. No. 4,136,243 or its equivalent British Specification No. 1,486,194 and in British Specification No. 1,554,340 or its equivalent German Offenlegungsschrift No. 2,729,126. Preferred donors are esters and organic silicon compounds. Preferred esters are esters of aromatic carboxylic acids, such as ethyl and methyl benzoate, p-methoxy ethyl benzoate, p-ethoxy methyl benzoate, p-ethoxy ethyl benzoate, ethyl acrylate, methyl methacrylate, ethyl acetate, dimethyl carbonate, dimethyl adipate, dihexyl fumarate, dibutyl maleate, ethylisopropyl oxalate, p-chloro ethyl benzoate, p-amino hexyl benzoate, isopropyl naphthenate, n-amyl toluate, ethyl cyclohexanoate, propyl pivalate. Examples of the organic silicon compounds useful herein include alkoxysilanes and acyloxysilanes of the general formula $R^1{}_n Si(OR^2)_{4-n}$ where n is between zero and three, $R^1$ is a hydrocarbon group or a halogen atom and $R^2$ is a hydrocarbon group. Specific examples include trimethylmethoxy silane, triphenylethoxy silane, dimethyldimethoxy silane, phenyltrimethoxy silane and the like. The donor used as selectivity control agent in the catalyst may be the same as or different from the donor used for preparing the titanium containing constituent. Preferred electron donors for use in preparing the titanium constituent are ethyl benzoate and isobutyl phthalate. Preferred as selectivity control agent in the total catalyst is p-ethoxy ethyl benzoate, phenethyltrimethoxy silane and diphenyldimethoxy silane.

The organoaluminum compound to be employed as cocatalyst may be chosen from any of the known activators in olefin polymerization catalyst systems comprising a titanium halide but is most suitably free of halogens. While trialkylaluminum compounds, dialkylaluminum halides and dialkylaluminum alkoxides may be used, trialkylaluminum compounds are preferred, particularly those wherein each of the alkyl groups has 2 to 6 carbon atoms, e.g., triethylaluminum, tri-n-propylaluminum, triisobutylaluminum, triisopropylaluminum and dibutyl-n-amylaluminum.

Preferred proportions of selectivity control agent, employed separately, in combination with, or reacted with an organoaluminum compound, calculated as mol per mol aluminum compound, are in the range from 0.005 to 1.5, particularly from 0.1 to 0.5. Preferred portions of selectivity control agent calculated as mol per mol Ti is in the range of 0.1 to 50, particularly 0.5 to 20. Proportions of electron donor contained in the solid catalyst component, calculated as mol per mol of magnesium, are suitably in the range of from 0.01 to 10, e.g., from 0.01 to 10 and from 0.05 to 5.0 and especially from 0.05 to 0.5.

To prepare the final polymerization catalyst composition, procatalyst, cocatalyst and selectivity control agent, if used may be simply combined, most suitably employing a molar ratio to produce in the final catalyst an atomic ratio of aluminum to titanium of from 1 to 150, and suitably from about 10 to about 150. Preferably the components are premixed before they are injected into the reactor but they may be injected separately into the reactor. The catalysts of this invention tend to exhibit very good activity at much lower Al:Ti ratios, e.g., below 80:1 and even below 50:1, than prior art catalysts of the same type. It may, however, be advantageous under some conditions to employ them at higher Al:Ti ratios. Increasing the Al:Ti ratio tends to increase catalyst activity at the expense of increased catalyst residue in the unextracted product. These factors, as well as the desired level of isotacticity, will be considered in selecting the Al:Ti ratio for any given process and desired product. In general, Al:Ti ratios in the range of 30:1 to 100:1 and especially of about 50:1 to 80:1 will be found advantageous.

The present invention is also concerned with a process for polymerizing an alpha monoolefin such as ethylene or butylene, preferably propylene, employing the novel catalyst components and compositions. These polymerization may be carried out by any of the conventional techniques, such as gas phase polymerization or slurry polymerization using liquid monomer or an inert hydrocarbon diluent as liquid medium. Hydrogen may be used to control the molecular weight of the polymer without detriment to the stereospecific performance of the catalyst with constant or intermittent supply of the novel catalyst compositions or one or more of the catalyst components to the polymerization reactor. The activity and stereospecificity of the novel catalyst compositions are so pronounced that there is no need for any catalyst removal or polymer extraction techniques. Total metal residues in the polymer, i.e., the combined aluminum, magnesium and titanium content, can be as low as 150 ppm, even less than 75 ppm.

It is well known that supported coordination procatalysts and catalyst systems of the type used herein are highly sensitive, in varying degrees, to catalyst poisons such as moisture, oxygen, carbon oxides, acetylenic compounds and sulfur compounds. It will be understood that in the practice of this invention, as well as in the following examples, both the equipment and the reagents and diluents are carefully dried and freed of potential catalyst poisons.

The productivity of the procatalyst is determined as kg polymer/g procatalyst in a standard one or two hour batch reaction; it may also be expressed as kg polymer/g Ti. Catalyst activity is sometimes reported as kg polymer/g procatalyst/hr. If determined in a standard one hour test, activity thus is numerically the same as productivity.

The selectivity to isotactic polypropylene is determined by measuring the amount of xylene soluble polymer (XS), in accordance with regulations of the U.S. Food and Drug Administration. The XS test is carried out as follows:

The sample is completely dissolved in xylene, which contains oxidation inhibitor, in a stirred flask by heating under reflux at 120° C. The flask is then immersed in a water bath at 25° C. without stirring for one hour, during which the insoluble portion precipitates. The precipitate is filtered off and the solubles present in the filtrate are determined by evaporating a 10 ml aliquot of the filtrate, drying the residue under vacuum, and weighing the residue. The xylene-solubles consist of amorphous material with some low molecular weight crystalline material. (FDA regulations 121.2501 and 1.1.2510, 1971.)

The numerical value of XS in the case of propylene homopolymer is typically about 2 percent less than the amount of polymers extractable in refluxing n-heptane. Thus the isotacticity index of polypropylene (amount insoluble in refluxing n-heptane) is approximately $100-(XS+2)$.

Catalyst productivity at standard conditions exhibits an inverse relationship with stereoselectivity. This relationship is characteristic for any given procatalyst. It is generally possible to control these variables, within limits, by changing the proportion of selectivity control agent (SCA). Increasing the amount of SCA increases selectivity to isotactic or stereoregular polymer but reduces activity, and hence productivity, in a standard one hour test.

The following examples illustrate the invention:

ILLUSTRATIVE EMBODIMENT I

Preparation of the magnesium containing precursors

A. Preparations using exact stoichiometry (i.e. $OCH_3/Cl=3.0$)

1. (Staying within the metastable wedge.) Anhydrous magnesium chloride was dissolved in methanol and about 1/6 of the solvent distilled away. 3.0 equivalent of magnesium metal was added slowly, to maintain a gentle reflux, then the reaction kept under reflux to finish the magnesium consumption. After standing, a mixture of pumpkin shaped crystals and some grey powder was obtained. The product was slurried in a mixture of methanol/isopropanol and the grey powder decanted. After washing again with the methanol/isopropanol solution, the crystals were dried under moving nitrogen to give a recovery of 65% basis total magnesium. (Analysis: $Mg=15.5\%$, $Cl=12.2\%$, $Mg/Cl=1.85$ mol/mol). The mother liquor had the approximate composition of 8.5% $Mg(OCH_3)_2$ +3.0% $MgCl_2$, a stable solution according to the ternary phase diagram.

2. (Leaving the metastable wedge by dilution.) The preparation was carried out as in example 1 except that, at the end of the reflux, an equal volume of isooctane was added to the hot methanol solution together with enough isopropanol to yield a homogeneous solution. Upon cooling, the yield of crystalline product was essentially quantitative, based on total magnesium. (Analysis: $Mg=14.1\%$, $Cl=10.4\%$, $Mg/Cl=2.0$ mol/mol). In contrast to example 1, the product appeared to be a mixture of crystalline forms.

B. Preparations using excess chloride (i.e. $OCH_3/Cl<3$).

3. (Moving outside the metastable wedge via high Cl concentration.) Commercially available magnesium chloride was dissolved in 8% commercially available methanolic magnesium methoxide (70 g $MgCl_2$ per quart of solution). After standing overnight the floculant magnesium was filtered away from the solution. 1.5 liter of the clear solution was mixed with 1.5 l of of isooctane and 0.8 l of isopropanol was added to insure homogeniety. The solution was stirred at 230 rpm with a teflon paddle stirrer. After a day, the precipitate was collected, washed with isooctane and dried under moving nitrogen. The yield, based on total magnesium, was 42%. (Analysis: $Mg=15.9\%$, $Cl=22.8\%$, $Mg/Cl=1.0$ mol/mol). The product appeared to be a mixture of at least two compounds consisting of well formed crystals in the 5-30 micron range.

4. Anhydrous magnesium chloride was dissolved in methanol then 1.0 equivalent of magnesium turnings was added at a rate so as to maintain a gentle reflux. After magnesium addition was finished, heat was applied and reflux was continued overnight. Then an equal volume of isooctane was added, to the hot solution, together with sufficient isopropanol to homogenize. The solution was allowed to cool, with vigorous stirring, to give spheroidal amorphous product in the size range of 20-80 microns. The yield, based on total magnesium, was 81.5%.

C. Preparation with excess chloride in the presence of $SiCl_x(OCH_3)_y$ buffer.

5. Magnesium (43 g, 1.77 mol) was added, in 5-8 g portions, to 1200 ml of methanol in a 2 l erlenmeyer flask. The solvent was heated gently to initiate the magnesium dissolution. After that, the heat of reaction was sufficient to maintain a gentle reflux. After all of the magnesium had dissolved, silicon tetrachloride (45 g, 264 mmol; 20% excess basis total Cl) was added slowly (since this presents a rather exothermic acid/base reaction). Two of these preparations were combined and sufficient methanol distilled away to bring the total volume to 1.6 to 1.7 l. The hot solution, 'A', was then poured into a 2 l reaction kettle, equipped with a large bladed paddle stirrer and stainless steel baffles, and stirred at high speed until the solution had cooled and a large mass of small crystals was obtained. The crystals were collected upon a coarse fritted funnel, washed twice with a mixture of 500 g isooctane/150 g isopropanol, washed twice with isooctane and dried under moving nitrogen for about 20 minutes. The yield was 420 g (71%). Visible and scanning electron microscopic examination reveal the product to be of a homogeneous crystal type in the shape of rhombic dodecahedrons such as seen in FIG. 3.

6. 105 g of the hot solution 'A', from example 5, was mixed with 61 g of toluene to give a clear solution. Upon stirring overnight 8.1 g of well formed, transparent crystals, in the shae of rhombic dodecahedrons such as seen in FIG. 3, were obtained.

In the above examples, the crystals made in Example 1 demonstrate the preparation according to the invention, and make good catalysts. Example 2 is outside the wedge ABC and does not make good catalysts. Likewise examples 3 and 4 are also outside the invention. Examples 5 and 6 show buffered systems according to the present invention.

Preparation of the Procatalysts

The procatalysts (examples 7-17) were prepared as follows: Electron donor (type and amount shown in Table 1) were added along with 150 ml of a 1:1 (vol:vol) mixture of titanium tetrachloride and chlorobenzene to 50 mmol of the appropriate magnesium precursor (Table 1) and stirred at room temperature for 15 minutes. The mixture was then stirred for an hour at 100, 110 or 120° C. (as shown on tables) and filtered hot. The residual solid was slurried in 150 ml of the 1:1 titanium tetrachloride/chlorobenzene solution, 0.2 to 0.4 ml of phthaloyl chloride (as shown on table) was added (U.S.

Patent No. 4,535,068), and the slurry stirred for 30–60 minutes at 110° C. After a hot filtration, the solid was slurried in 150 ml of the 1:1 titanium tetrachloride/chlorobenzene solution and stirred at 110° C. for 30 minutes and filtered hot. The reaction vessel was cooled to below 40° C. and the solid was washed 6 times with 150 ml portions of isopentane then dried for 100 minutes, at 40° C., under moving nitrogen. The titanium content of the various procatalysts is shown in Table 1.

TABLE 1

| Example # | Mg Precursor | Electron Donor | (% wt) | Titanium | Comments |
|---|---|---|---|---|---|
| 7 | 1 | iBP (9.7 mmol) | 3.44 | | |
| 8 | 1 | iBP (6.0) | 4.63 | | |
| 9 | 1 | iBP (7.5) | 4.06 | | |
| 10 | 1 | MpT (16.7) | 5.30 | | |
| 11 | 2 | iBP (7.6) | 4.10 | | |
| 12 | 3 | iBP (17.3) | 4.98 | | |
| 13 | 4 | iBP (11.1) | 4.81 | | |
| 14 | 5 | iBP (9.9) | 4.67 | | |
| 15 | 5 | iBP (8.7) | 2.00 | | The magnesium precursor was boiled in isooctane for 1 hr to remove 92% of the bound methanol. |
| 16 | 5 | iBP (8.7) | 4.49 | | |
| 17 | 6 | iBP (8.7) | 4.04 | | | iBP = isobutylphthalate
MpT = methyl-p-toluate

Liquid Pool (LIPP) and Gas Phase Propylene Polymerizations

LIPP polymerizations were carried out for two hours at 67° C. in a 1 gal autoclave, using 2.7 l of propylene, 132 mmol of hydrogen, and sufficient catalyst to provide 8 micromoles of titanium. Triethylaluminum (70 mol/mol Ti) was mixed with 17.5 mmol of SCA (ethyl-p-ethoxybenzoate for example #23, diphenyldimethoxysilane for all others) and either premixed with the procatalyst 5 to 30 minutes before injection or injected directly to the autoclave before procatalyst injection.

Gas phase polymerizations were carried out, for two hours at 67° C., at a pressure of 300 psig, with a 10 g/min propylene flow, in a 4 gal autoclave equipped with a ribbon stirrer. After gas flow had been established in the autoclave, the SCA was injected (17.5 mol/mol Ti) followed by the triethyl aluminum (70 mol/mol Ti) followed by the procatalyst (sufficient to provide 8 micromoles of titanium).

The results are shown in Table 2. Note that examples 23–26 are really counterexamples using catalysts prepared from magnesium chloro methoxides which are not pure $Mg_4(OMe)_6(MeOH)_{10}Cl_2$ and that is why their productivities are so much poorer than the others. Catalyst nos. 7–17 are those made in Examples 7–17, respectively.

TABLE 2

| Example # | Catalyst # | Productivity (Kg PP/g cat) | X.S. (% wt) | Phase (g/l) | Morphology Details |
|---|---|---|---|---|---|
| 18 | 7 | 44.7 | 6.8 | l | |
| 19 | 7 | 24.0 | 4.5 | g | 0.37 b.d., 84.5% of polymer at 0.25–2.0 mm |
| 20 | 8 | 40.6 | 9.1 | l | 0.32 b.d., 85.6% of polymer at 0.50–2.0 mm |
| 21 | 8 | 20.4 | 13.8 | g | 0.35 b.d., 88.6% of polymer at 0.50–2.0 mm |
| 22 | 9 | 40.9 | 6.1 | l | 0.39 b.d., 87.1% of polymer at 0.25–2.0 mm |
| 23 | 10 | 18.8 (1 hr) | 7.9 | l | |
| 24 | 11 | 24.9 | 6.5 | l | |
| 25 | 12 | 6.0 | 8.5 | l | |
| 26 | 13 | 10.5 | 9.7 | l | |
| 27 | 14 | 66.1 | 7.2 | l | 0.43 b.d. |
| 28 | 14 | 15.8 | 5.4 | g | |
| 29 | 15 | 34.3 | 3.4 | l | 0.37 b.d., 84.3% of polymer at 0.25–2.0 mm |
| 30 | 15 | 10.2 | 2.0 | g | |
| 31 | 16 | 46.1 | 6.2 | l | 0.39 b.d., 80.7% of polymer at 0.5–2.0 mm |
| 32 | 17 | 63.9 | 7.5 | l | 0.36 b.d. |
| 33 | 17 | 20.9 | 5.4 | g | |

"g" is gas phase polymerization; X.S. is xylene solubles
"l" is liquid phase polymerization
"b.d." is bulk density

ILLUSTRATIVE EMBODIMENT II

In this Illustrative Embodiment, the preparation of the magnesium containing precursors was carried out according to preparation C in Embodiment Illustrative I with the exception that bromide replaced chloride in all cases. The resulting crystals were in the shape of dodecahedrons, such as seen in FIG. 4. Some of the magnesium precursors were post treated with HCl gas in isooctane or by boiling them in an inert hydrocarbon to remove some of the methanol groups and improve the stability. The catalyst preparation was carried out as set forth in Illustrative Embodiment I with the details and modifications shown in Table 3.

TABLE 3

| Example No. | Electron Donor | Titanium, % wt. | Comments |
|---|---|---|---|
| 34 | iBp (2.5 ml) | 3.91 | 0.3 ml PC, 110° C. digest |
| 35 | iBp (3.0 ml) | 3.12 | 0.3 ml PC, 120° C. digest |
| 36 | iBp (2.5 ml) | 3.08 | 0.3 ml PC, 120° C. digest |
| 37 | iBp (2.5 ml) | 2.93 | 0.4 ml PC, 110° C. digest, 120° C. wash |
| 38 | iBp (3.0 ml) | 3.91 | no PC; 120° C. digest |
| 39 | iBp (1.73 ml + 0.3 mlEB) | 4.41 | 120° C. digest. Post treatment with HCl |

TABLE 3-continued

| Example No. | Electron Donor | Titanium, % wt. | Comments |
|---|---|---|---|
| 40 | iBp (1.73 ml + 0.3 mlEB) | 5.06 | 110° C. digest. Post treatment with HCl in isooctane |
| 41 | iBp (1.73 ml + 0.3 mlEB) | 4.75 | 100° C. digest. Post treatment with HCl in isooctane |
| 42 | iBp (3.0 ml) | 3.23 | 0.3 ml PC, 110° C. digest, boiling isooctane post treatment |
| 43 | iBp (2.5 ml) | 3.37 | 0.3 ml PC, 110° C. digest, boiling isooctane post treatment |
| 44 | iBp | 1.00 | Boiled in decalin |
| 45 | iBp (1.73 ml + 0.3 mlEB) | — | — |
| 46 | iBp (1.73 ml + 0.3 mlEB) | — | Standard magnesium chloride supported catalyst via Mg(OEt)$_2$ | iBp = diisobutylphthalate
PC = phthaloyl chloride
EB = ethyl benzoate

The catalyst from Table 3 were utilized in the polymerization of propylene both in liquid phase and gas phase operations. The polymerizations were carried out according to the procedures set forth in Illustrative Embodiment I and the results of the polymerizations are set forth below in Table 4.

TABLE 4

| Example # | Catalyst Example # | Productivity (Kg PP/g cat) | X.S. (% wt) | Phase (g/l) | Morphology Details |
|---|---|---|---|---|---|
| 47 | 34 | 61.4 | 4.8 | l | b.d. = 0.33 |
| 48 | 34 | 19.5 | 4.0 | g | b.d. = 0.35 |
| 49 | 35 | 50.7 | 4.1 | l | b.d. = 0.444 |
| 50 | 35 | 19.0*, 35 | 1.9*, 4.5 | g | b.d. = 0.36*, 0.39 |
| 51 | 36 | 48.8 | 3.6 | l | b.d. = 0.405 |
| 52 | 36 | 20.8*, 37.9 | 2.3*, 3.0 | g | b.d. = 0.35*, 0.38 |
| 53 | 37 | 48.8 | 4.1 | l | b.d. = 0.39 |
| 54 | 37 | 28.8 | 4.4 | g | b.d. = 0.394 |
| 55 | 38 | 58.2 | 6.1 | l | b.d. = 0.41 |
| 56 | 38 | 33.5 | 5.2 | g | b.d. = 0.405, 2.7% fines below 120 microns |

*Two hour polymerizations at 67° C.

| | | | | | |
|---|---|---|---|---|---|
| 57 | 39 | 32.0 | 5.7 | l | b.d. = 0.419 |
| 58 | 40 | 41.6 | 6.6 | l | b.d. = 0.448, 0.4% fines below 120 microns |
| 59 | 41 | 37.0 | 7.4 | l | b.d. = 0.412 |

The above three polymerizations were all in liquid phase at 67° C.

| | | | | | |
|---|---|---|---|---|---|
| 60 | 42 | 18.6 | 3.7 | l | b.d. = 0.378 |
| 61 | 42 | 16.9 | 4.1 | l | b.d. = 0.372 |
| 62 | 42 | 11.9 | 7.4 | l | b.d. = 0.412 |
| 63 | 43 | 8.7 | 4.9 | l | |
| 64 | 44 | 0.1 | | l | |
| 65 | 45 | 35.2 | | g | b.d. = 0.378, 0.7% fines below 120 microns |
| 66 | 46 | 18.01 | 2.4 | g | b.d. about 0.3, 7.5% fines below 120 microns |

"g" is gas phase polymerization
"l" is liquid phase polymerization
"b.d." is bulk density It can be seen by reviewing the results of Example 66 that a standard magnesium chloride catalyst produces polymer with a relatively high amount of fines below 120 microns, i.e. 7.5%. Examples 56 and 65, which utilize catalysts which were not post treated but which were prepared according to the present invention, give polymer with much lower fines, i.e. 2.7% and 0.7% below 120 microns. Example 58 wherein the catalyst was prepared according to the present invention and was post treated with hydrogen chloride gave polymer with the lowest percentage of fines of all, i.e. 0.4% below 120 microns. The bulk density of the polymer produced in the above three examples wherein the catalyst was prepared according to the present invention was higher than the bulk density of the polymer prepared from the standard magnesium supported catalyst.

ILLUSTRATIVE EMBODIMENT III

Example 65

Preparation of Unstabilized Mg(OMe)$_2$ Solution

Mg turnings (28.2 g, 1.16 mol) were added in 2 gm portions, over the course of an hour, to 750 ml of methanol. If this unstabilized solution is allowed to heat above 45° C. the Mg(OMe)$_2$ is liable to undergo spontaneous polymerization to an intractable solid. The warm solution was filtered through a medium porosity glass frit and diluted to 900 ml.

Preparation of MgBr$_2$/Si(OMe)$_4$ Solution

Silicon tetrabromide (52.4 g, 0.151 mol) was added dropwise to 234 ml (0.302 mol) of the above Mg(OMe)$_2$ solution followed by 50 ml of methanol, thereby generating the stabilizing Si(OR)$_4$ species in situ.

Preparation of Mg$_4$(OMe)$_6$(MeOH)$_{10}$Br$_2$

A 50° C. solution of this MgBr$_2$/Si(OMe)$_4$ (100 mmol Mg) was added rapidly to a stirred 50° C. solution of Mg(OMe)$_2$ (258 mmol Mg) prepared above. After stirring 45 minutes, the crystalline precipitate was collected by filtration, washed once with an isooctane/isopropanol (4:1) solution, twice with isooctane and then dried under moving nitrogen. The yield was 57.0 gm (84%) of crystals of the shape shown in FIG. 4 with average particle size of 20 microns. Upon boiling in isooctane for 1 hour, a 20 gm sample decreased in weight to 17 gm, indicating a loss of 44.5% of the bound methanol.

Example 66

A solution of commercially available 8% Mg(OMe)$_2$ in methanol (270 gm, 0.25 mol) was heated to 47° C. whereupon silicon tetrabromide (33 mmol) was added dropwise over about 5 minutes. After stirring 15 minutes, the crystalline precipitate was collected by filtration, washed 3 times with isooctane and dried under moving nitrogen. The yield was 25.2 gm (52.8%) of crystals in the size range of 30–80 microns with shapes consisting of a mixture of the dodecahedra of FIG. 3 and 4.

Example 67

Preparation of Stabilized Mg(OMe)$_2$ Solution

Tetramethoxysilane or tetraethoxysilane (7.73 gm, 50.8 mmol; 10.6 gm, 50.8 mmol) is dissolved in 270 ml MeOH and then magnesium (9.4 gm, 387 mmol) is added in 1 gm portions, as hydrogen evolution subsides, over a one hour period. The solution is filtered through a medium porosity glass frit and diluted with MeOH to 270 ml (if necessary).

Preparation of MgBr$_2$ Solution

Bromine (20.6 g, 258 mmol) is dissolved in 150 ml of ice cooled methanol. Magnesium (3.13 g, 129 mmol) is added in 0.5 g portions over 2 hours, with rapid stirring. Tetramethoxysilane (2.58 gm, 17 mmol) was added to the solution.

Preparation of Mg$_4$(OMe)$_6$(MeOH)$_{10}$Br$_2$

The MgBr$_2$ solution (above) was heated to 62° C. and added rapidly to a stirred solution of Mg(OMe)$_2$ (above), also at 62° C. After stirring at 55°–64° C. for 1 hour, the solid was collected by filtration, washed twice with isooctane/isopropanol (3/1) solution, twice with isooctane and then dried under moving nitrogen. The yield was 73.3 gm (75.2%) of crystals of the shape of FIG. 4. Analysis: 12.94% Mg, 63.7% MeOH.

Example 68

Preparation of MgBr$_2$ Solution

As in Example 67 using 19.0 gm Br$_2$ in 134 ml methanol plus 2.89 gm Mg.

Preparation of Stabilized Mg(OMe)$_2$ Solution

As in Example 67 using 11.8 gm phenyltrimethoxysilane dissolved in 270 ml methanol plus 8.68 gm Mg.

Preparation of Mg$_4$(OMe)$_6$(MeOH)$_{10}$Br$_2$

As in Example 67 via rapid mixing of the above two solutions at 60° C. Yield: 70.7 gm (78.6%). Analysis: 12.83% Mg, 67.02% methanol and 20.46% bromine.

Example 69

Preparation of Mg Br$_2$ Solution

As in Example 67 using 19.0 gm Br$_2$ in 134 ml methanol plus 2.89 gm Mg.

Preparation of Stabilized Mg(OMe)$_2$ Solution

As in Example 67 using 7.38 gm trimethoxyphosphite (P(OME)$_3$) dissolved in 270 ml methanol plus 8.68 gm magnesium.

Preparation of Mg$_4$(OMe)$_6$(MeOH)$_{10}$Br$_2$

As in Example 67 via rapid mixing of the above two solutions at 58° C. Yield 68.1 gm (75.7%).

Example 70

Preparation of Mg$_4$(OEt)$_6$(MeOH)$_3$Br$_2$ 2.0 gm of Mg$_4$(OMe)$_6$Br$_2$ (Example 67) was slurried in 200 gm of tetraethoxysilane in a sealed bottle and gently rolled in an oil bath. After 17.5 hours at 35° C. the slurry had become milky. The temperature was then held at 50° C. for 27 hours, at 75° C. for 2.3 hours, at 105° C. for 14 hours (whereupon the milkiness had disappeared and definitely crystalline product was being produced) and then finally at 125° C. for 8 hours. The mixture was cooled to room temperature and the solids were collected on a coarse fritted glass funnel, washed twice with isooctane and dried under moving nitrogen. The yield was 16.3 g of 12–50 micron clusters of nearly cubic parallelipipeds. Analysis: 23.2% Br, 15.75% Mg, 46.6% EtOH, and 15.2% MeOH.

Example 71

A catalyst was prepared from the Mg$_4$(OEt)$_6$(MeOH)$_3$Br$_2$ of Example 70 according to the procatalyst preparation procedure of Illustrative Embodiment I with the exception that 0.35 ml of p-toluoyl chloride was used instead of phthaloyl chloride. 1.74 ml of isobutylphalate was added as the electron donor and the catalyst contained 2.71% titanium.

This catalyst was used to polymerize propylene according to the LIPP polymerization procedure set forth in Illustrative Embodiment I. 0.56 mmol of triethyl aluminum, 0.105 mmol of diphenyldimethoxy silane and 5.7 micromols of titanium were used. The productivity of the catalyst was determined to be 39.5 kg of polypropylene per gm of catalyst and the polymer contained 4.1% xylene solubles. The bulk density of the polymer was 0.295 and its shape was cubes and agglomerates of cubes.

ILLUSTRATIVE EMBODIMENT IV

Example 72

To 111 gm of 12% Mg(OMe)$_2$ solution (stabilized and containing 154 mmol Mg, 19 mmol Si(OR)$_4$) stirred at room temperature was added dropwise a solution of 8.6 gm resorcinol (78.1 mmol) in 9.0 gm of methanol. After 37% of the resorcinol had been added, precipitation began. The Mg(OMe)$_2$ solution was then heated to 60° C. and the rest of the resorcinol solution was added. After stirring one hour at 60° C., the solution was allowed to cool. The solids were collected by filtration, washed with isopropanol/isooctane solution (1:3,wt:wt), then isooctane and then dried under moving nitrogen to yield 30.4 gm (96.3%) of crystalline material. Under microscopic examination the crystal shape appeared as in FIG. 7.

Example 73

100 gm of 12% Mg(OMe)$_2$ solution (stabilized and containing 139 mmol Mg) was heated to 60° C. Then a mixture of 3.74 gm resorcinol (34 mmol) and 6.28 gm methacrylic acid (77.6 mmol) in 10 ml of methanol was added dropwise to give a crystalline precipitate. After filtering and i-C$_8$ wash and N$_2$ drying, 16.0 gm of very dense crystals were obtained in the shape of short square cylinders as in FIG. 5 (under microscope).

Example 74

To 100 gm of 12% Mg(OMe)$_2$ solution (stabilized and containing 139 mmol Mg and 17 mmol Si(OR)$_4$) at 60° C. was added 7.31 gm of 2,4-pentanedione (73 mmol) to obtain a clear solution. To this was added 3.74 gm of resorcinol (34 mmol) as a 53% solution in methanol. After stirring at 60° C. for less than 1 hour, a voluminous precipitate appeared. Filtration, i-C$_8$ wash and N$_2$ drying yielded 17.9 gm of fluffy crystalline powder. Tiny crystalline flakes were seen in a microscope (FIG. 9).

Example 75

Preparation of Catalyst from the Resorcinolate Species: (Mg(OCH$_3$)$_6$ (CH$_3$OH)$_{10}$) (C$_6$H$_4$OHO)$_2$ Prepared in Example 72

40 g was placed in 300 gm of cyclohexane with 120 g of tetraethoxysilane (TEOS). This mixture was placed in a 110° C. oil bath and allowed to boil about 1.5 hours (to lose about 20% of the total volume). After filtration and drying, 32.1 g of solid material was obtained.

7.8 gm of this material (containing 49 mmol of Mg) was then subjected to a standard 115° C. catalyst preparation where 2.5 ml of isobutylphthalate was used in a digest of 200 ml of 50/50 TiCl$_4$/Cb and 0.5 ml phthaloyl chloride plus 0.5 ml phthaloyl chloride plus 0.5 ml of p-toluoyl chloride were used in 200 ml of 50/50 TiCl$_4$/CB as a first wash. 200 ml of 50/50 TiCl$_4$/CB were used as a second wash. A 10 minute wash of 100 ml of 50/50 TiCl$_4$/CB @115° C. was then applied followed by 6 150 ml isopentane washes and N$_2$ drying @40° C. The yield was 6.5 gm of dark brown powder. Analysis: Ti=3.23%, Mg=19.6%, Cl=63.1%.

Examples 76–78

The catalyst made in Example 75 was used to polymerize propylene by the LIPP procedure set forth in Illustrative Embodiment I. In two of the examples, a different selectivity control agent, tetramethylpiperidine (TMP), was used in place of the diphenyldimethoxy silane (DPDMS). The results of the polymerizations are shown in Table 5.

TABLE 5

| Example No. | Titanium (mmol) | TEA (mmol) | SCA (mmmol) | SCA (type) | Productivity (kg polypropylene/gm catalyst/hr) | Xylene Solubles (% wt) |
|---|---|---|---|---|---|---|
| 76 | 0.006 | 0.42 | 0.048 | TMP | 71.8 | 8.3 |
| 77 | 0.0045 | 0.32 | 0.014 | DPDMS | 50.0 | 5.0 |
| 78 | 0.0045 | 0.32 | 0.048 0.014 | TMP+ DPDMS | 58.0 | 4.6 |

With TMP as the selectivity control agent, a high yield is obtained but the xylene solubles are also high. With DPDMS, a lower yield is obtained but the xylene solubles are low. When the two selectivity control agents are mixed together, an intermediate yield is obtained but the xylene solubles are lower still.

Illustrative Embodiment V 106 gm of 8% Mg(OMe)$_2$ solution (97 mmol Mg, 12 mmol Si(OR)$_4$) was stirred at 60° C. To this solution was added dropwise a solution of 51 mmol of the appropriate acid shown in Table 6 in 10 ml of methanol. After precipitation, the solids were collected by filtration, washed twice with isooctane and then dried under moving nitrogen. Yields and crystal shapes are shown in Table 6. The acetate salt is prepared in the same manner but must be ice-cooled to give a precipitate of crystals in the shape of FIG. 8.

TABLE 6

| Example | Acid used | Product Molecular Weight | Yield (gm) | Yield (%) | Shape |
|---|---|---|---|---|---|
| 79 | Chloroacetic | 198.2 | 10.9 | 56.5 | FIG. 12 |
| 80 | Methacrylic | 194.0 | 13.4 | 71.0 | FIG. 5 |
| 81 | Methacrylic (via 12% Mg(OMe)$_2$) | 194.0 | 27.1 | 90.6 | FIG. 5 & 6 |
| 82 | Acrylic | 186.98 | 8.3 | 45.6 | FIG. 8 |
| 83 | Propionic | 187.99 | 8.2 | 44.8 | FIG. 10 |
| 84 | Butyric | 195.0 | 8.4 | 44.3 | FIG. 6 |
| 85 | Benzoic | 212.01 | 12.9 | 62.6 | FIG. 11 |

ILLUSTRATIVE EMBODIMENT VI

In Situ Generation of Phosphorous Esters as Stabilizing Agents

Example 86

In like manner to Example 69, 9:4 gm of Mg was dissolved in methanol to prepare a solution volume of 310 ml. Phosphorous trichloride (9.3 gm, 68 mmol) was added dropwise to 64 ml of that solution, then the remainder of the magnesium methoxide solution (246 ml) was added rapidly at 50° C. Cooling to room temperature yielded a crop of large, well formed crystals.

Example 87

The above experiment was repeated using 18.4 g of phosphorous tribromide instead of PCl$_3$ to yield 29.4 g of well formed crystals with average particle size of 19.5 microns.

ILLUSTRATIVE EMBODIMENT VII

Demonstration of Thermal Instability of Mg(OMe)$_2$ Solutions

Example 88

A 250 g sample of commercially available 8% Mg(OMe)$_2$ in methanol turned quite cloudy upon heating to 50° C. It was then heated to boiling and 1/3 of the solvent was boiled away. After cooling, the solvent was replaced but the white precipitate die not redissolve. The precipitate was collected on a fritted filter, washed with isooctane and dried under moving nitrogen (weight 5.0 gm). Assuming the product to be Mg(OMe)$_2$ · 2 MeOH polymer (m.w. 150.44), that implies that more than 14% of the Mg(OMe)$_2$ had decomposed to that intractable polymer. On the other hand, the Si(OR)$_4$ stabilized 12–15% solutions described herein may be refluxed nearly indefinitely with practically no observable signs of decomposition.

I claim:

1. A crystalline magnesium halide/titanium halide catalyst component useful for the polymerization of olefins which has been obtained by the process comprising contacting a crystalline alkoxy magnesium compound with a halide of tetravalent titanium and contacting the resulting halogenated product with a tetravalent titanium halide, wherein the alkoxy magnesium compound is selected from the group consisting of compounds with the following formula: $[Mg_4(OR)_6(R'OH)_{10}]X$ where X is a counter ion or ions having a total charge of $-2$ and where R and R', which may be the same or different, are selected from alkyl groups of 1 to 4 carbon atoms.

2. The crystalline magnesium catalyst component of claim 1 wherein step (a) is carried out in the presence of an electron donor.

3. The crystalline magnesium catalyst component of claim 2 wherein the alkoxy magnesium compound is contacted with the halide of tetravalent titanium in the presence of a halohydrocarbon.

4. The crystalline magnesium catalyst component of claim 3 wherein the tetravalent titanium compound is titanium tetrachloride and the halohydrocarbon is a chlorohydrocarbon and the electron donor is an ester or diester of an aromatic carboxylic acid.

5. The crystalline magnesium catalyst component of claim 1 wherein the tetravlent titanium halide is titanium tetrachloride.

6. The crystalline magnesium catalyst component of claim 1 wherein the alkoxy magnesium compound is heated in an inert light hydrocarbon to remove a portion or all of the methanol groups prior to contacting with said catalyst component with the halide of tetravalent titanium.

7. The crystalline magnesium catalyst component of claim 6 wherein the inert light hydrocarbon is isooctane.

8. The crystalline magnesium catalyst component of claim 1 wherein the alkoxy magnesium compound is treated with HCl prior to contacting said compound with the halide of tetravalent titanium.

9. The crystalline magnesium catalyst component of claim 1 wherein the product from step b) is washed to remove unreacted titanium compounds and the solid product is recovered.

10. The crystalline magnesium catalyst component of claim 1 wherein X is selected from the group consisting $2BR^-$, $2Cl^1$, methacrylate, butyrate, resorcinolate, acrylate, acetate, propionate, 2,4-pentanedionate, chloroacetate and benzoate.

11. The crystalline magnesium catalyst component of claim 10 wherein X is $2Br^-$ or $2Cl^-$.

12. The crystalline magnesium catalyst component of claim 10 wherein X is resorcinolate.

13. An olefinic polymerization catalyst composition comprising an organoaluminum compound, a selectivity control agent, and the crystalline magnesium catalyst component of claim 11 wherein the atomic ratio of aluminum to titanium is about 30:1 to about 100:1.

14. The composition of claim 13 wherein X is selected from the group consisting $2BR^-$, $2Cl^-$, methacrylate, butyrate, resorcinolate, acrylate, acetate, propionate, 2,4-pentanedionate, chloroacetate and benzoate.

15. The composition of claim 13 wherein said organoaluminum compound is a trialkylaluminum and the selectivity control agent is selected from the group consisting of esters and diesters of aromatic carboxylic acids and silicon compounds of the general formula $R^1{}_nSi(OR^2)_{4-n}$, where n is between zero and three, $R^1$ is a hydrocarbon group or a halogen atom and $R^2$ is a hydrocarbon group.

16. The composition of claim 15 wherein the trialkyl aluminum is triethylaluminum.

17. The composition of claim 15 wherein the selectivity control agent is selected from ethylbenzoate and diisobutylphthalate.

18. The composition of claim 15 wherein the selectivity control agent is selected from diphenyldimethoxy silane and phenethyltrimethoxy silane.

19. The crystalline magnesium catalyst component of claim 14 wherein the crystalline alkoxy magnesium compound is treated with a buffering agent prior to contacting said crystalline alkoxy magnesium compound with the halide of tetravalent titanium.

20. The crystalline magnesium catalyst component of claim 19 wherein said catalyst component is heated in an inert light hydrocarbon to remove a portion or all of the methanol groups prior to contacting said catalyst component with the tetravalent titanium halide.

21. The crystalline magnesium catalyst component of claim 19 wherein said catalyst component is treated with HCl prior to contacting said catalyst component with the tetravalent titanium halide.

22. The crystalline magnesium catalyst component of claim 19 wherein the buffering agent is selected from the group consisting of silicon tetrachloride, silicon tetrabromide, tetramethoxy silane, tetraethoxy silane, phenyltrimethoxy silane, oxalic acid, acetic acid, formic acid, trimethoxyphosphine, trichlorophosphine and tribromophosphine.

23. The catalyst component of claim 1 wherein the crystalline alkoxy magnesium compound is treated with a buffering agent prior to contacting said crystalline alkoxy magnesium compound with the halide of tetravalent titanium.

24. The crystalline magnesium catalyst component of claim 23 wherein said catalyst component is heated in an inert light hydrocarbon to remove a portion or all of the methanol groups prior to contacting said catalyst component with the tetravalent titanium halide.

25. The crystalline magnesium catalyst component of claim 23 wherein said catalyst component is treated with HCl prior to contacting said catalyst component with the tetravalent titanium halide.

26. The crystalline magnesium catalyst component of claim 23 wherein the buffering agent is selected from the group consisting of silicon tetrachloride, silicon tetrabromide, tetramethoxy silane, tetraethoxy silane, phenyltrimethoxy silane, oxalic acid, acetic acid, formic acid, trimethoxyphosphine, trichlorophosphine and tribromophosphine.

27. An olefinic polymerization catalyst composition comprising an organoaluminum compound and the crystalline magnesium catalyst component of claim 19 wherein the atomic ratio of aluminum to titanium is about 30:1 to about 100:1.

28. An olefinic polymerization catalyst composition comprising an organoaluninum compound, a selectivity control agent, and the crystalline magnesium catalyst component of claim 23 wherein the atomic ratio of aluminum to titanium is about 30:1 to about 100:1.

29. The composition of claim 28 wherein X is selected from the group consisting $2Br^-$, $2Cl^-$, methacrylate, butyrate, resorcinolate, acrylate, acetate, propionate, 2,4-pentanedionate, chloroacetate and benzoate.

30. The composition of claim 28 wherein said organoaluminum compound is a trialkylaluminum and the selectivity control agent is selected from the group consisting of esters and diesters of aromatic carboxylic acids and silicon compounds of the general formula $R^1_nSi(OR^2)_{4-n}$, where n is between zero and three, $R^1$ is a hydrocarbon group or a halogen atom and $R^2$ is a hydrocarbon group.

31. The composition of claim 30 wherein the trialkyl aluminum is triethylaluminum.

32. The composition of claim 30 wherein the selectivity control agent is selected from ethylbenzoate and diisobutylphthalate.

33. The composition of claim 30 wherein the selectivity control agent is selected from diphenyldimethoxy silane and phenethyltrimethoxy silane.

* * * * *